March 5, 1946.  W. E. SCOTT  2,395,914
DECOY AIRPLANE
Filed April 29, 1943
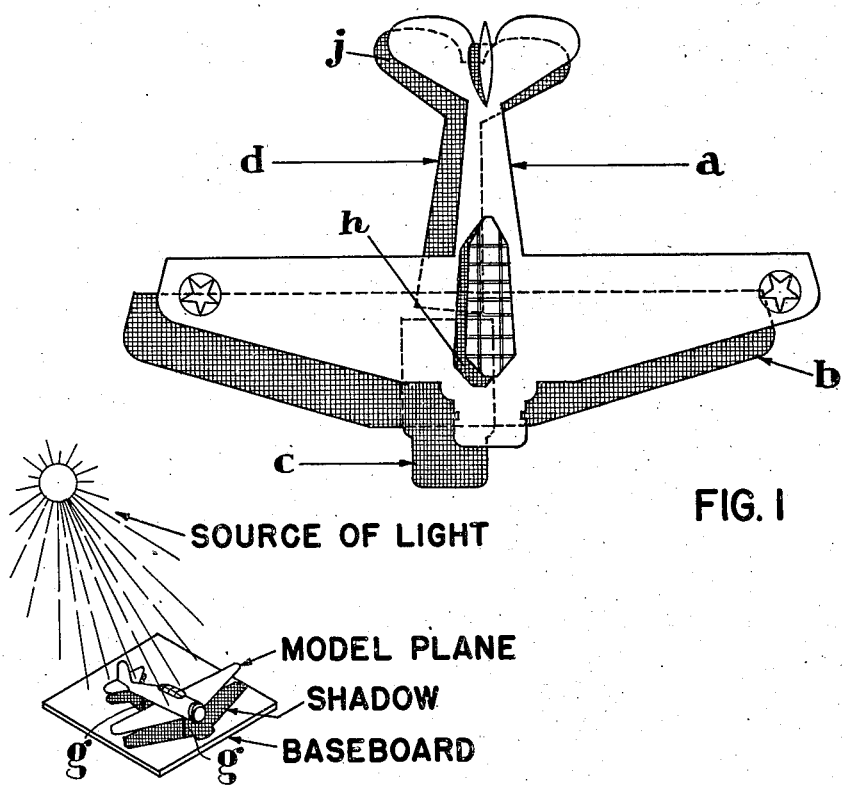
FIG. I
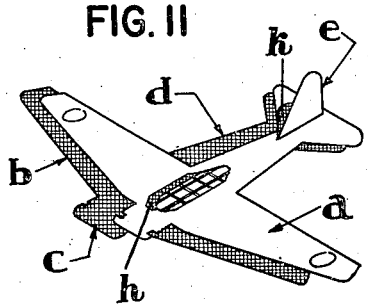
FIG. II
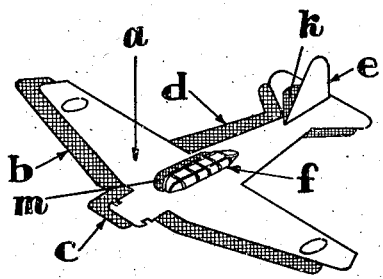
FIG. III  FIG. IV
INVENTOR
WILLIAM EDMISTON SCOTT
BY
ATTORNEY Patented Mar. 5, 1946

2,395,914

UNITED STATES PATENT OFFICE 2,395,914

DECOY AIRPLANE

William Edmiston Scott, United States Navy

Application April 29, 1943, Serial No. 485,015

2 Claims. (Cl. 35—1)

(Granted under the act of March 3, 1883, as amended April 30, 1928; 370 O. G. 757)

The present invention has to do with camouflaging by the use of decoy airplanes set out to attract the attention of the enemy and mislead them into the belief that actual planes and the possibility of an airfield are located where these decoys are placed. These decoys are inexpensively made and can be readily transported or moved from place to place.

In order to make my invention more clearly understood, I have shown in the accompanying drawing means for carrying the same into practical effect without limiting the designs in their useful applications to the particular constructions which, for the purpose of explanation, have been made the subject of illustration.

In the drawing:

Fig. I illustrates flat cut-outs of the type of plane to be simulated and of its shadow as it would appear from above, under the prevailing conditions of light, Fig. II is a small model of the plane on a white background, placed on the ground at the location and in the direction relative to the sun that the decoys are to be placed to determine the disposition of their shadow parts.

Fig. III shows a form of the device in which an outline cut-out of the vertical stabilizer is added for better effects, and Fig. IV illustrates another form in which a lightly constructed form simulating the cock-pit cowling, is added for a more realistic effect.

The special features involved in the design of these decoys incorporates flat cut-outs of the type of plane to be simulated, as illustrated in Fig. I of drawing.

The cut-outs which may be made of fabric or other desirable material, would be laid on the ground in such a position that they would represent the plane and its shadow.

The upper cut-out, which is designated $a$, would be painted in similar colors to the actual plane and would have special features such as cock-pit cowling, identification insignia, and other items painted on its surface. The outline may be shaded and high-lighted with paint to represent the curved form of the fuselage, wings, etc. Shadows of the cockpit cowling and vertical stabilizer may also be painted on if desired, as shown at $h$ and $j$ in Fig. I.

The lower cut-out is in three pieces, namely: $b$—port and starboard wings in one piece, $c$—engine and nacelle projection, and $d$—the after-portion of the fuselage and horizontal stabilizers. These would be placed so as to represent the shadow of the plane. This shadow would be determined by a small model of the plane on a white background, as illustrated in Fig. II.

The model plane may be very small and may be mounted above a baseboard representing the ground, by two posts $g$, $g$ in a normal attitude of rest, and the direction and extent of the shadows cast by it on the baseboard may then be observed at the place where the decoys are to be used, for the purposes of reproduction by the decoy cut-outs.

Having determined the location and amount of shadow, the cut-outs should be assembled to represent the plane and its shadow as indicated by the model.

The representation may be further enhanced by installing an outline cut-out of the vertical stabilizer made of stiffened sheet material, as indicated in Fig. III, at $e$, which will cast a real shadow $k$.

In Fig. IV, $f$ illustrates a scheme of installing a lightly constructed form that would be placed over the cut-out $a$ to represent the cock-pit cowling. This three-dimensional feature would introduce actual shadows $m$ on the surface of the cut-out, thereby creating a more realistic effect.

It may be found necessary in certain regions to move the decoys periodically throughout the day so as to avoid too great a discrepancy in the shadow as compared with the shadows of an actual plane. The number of times that a change would be necessary will depend on the prevailing light conditions.

This invention may be used by or for the Government of the United States for governmental purposes without the payment to me of any royalty thereon or therefor.

What I claim is:

1. A simple method of realistically simulating an airplane on the ground by placing a substantially flat cut-out formed like the plane at a desired location, placing a similarly outlined, dark and flat wing shadow cut-out under the wing portion of the plane cut-out extending from under it the proper amount and in the proper direction and placing a similarly outlined, dark and flat fuselage and tail shadow cut-out under the corresponding portions of the plane cut-out extending a varying amount and in a similar direction to represent the actual shadows in accordance with the different heights of the portions of the actual airplane being simulated.

2. A decoy airplane comprising a flat cut-out having the general outline of an airplane placed flat on the ground, a dark flat wing shadow cut-out placed under the wing portion of the plane cut-out and extending from under it in a direction and amount in accordance with the position of the sun, and a dark flat fuselage and tail shadow cut-out placed under the fuselage and tail portion of the plane cut-out and extending a variable amount at different points in accordance with the varying height of this portion of the actual plane being simulated.

WILLIAM EDMISTON SCOTT.